United States Patent
Hou et al.

(10) Patent No.: US 12,521,644 B2
(45) Date of Patent: Jan. 13, 2026

(54) EQUIPMENT FOR PRODUCTION OF BUTANOL AND OCTANOL AND TRIPLE-EFFECT DISTILLATION METHOD

(71) Applicant: TIANJIN SHENLAN CHEMICAL TECHNOLOGY CO., LTD, Tianjin (CN)

(72) Inventors: Wengui Hou, Tianjin (CN); Zhuo Zhang, Tianjin (CN); Mingzhu Li, Tianjin (CN); Yingqin Xie, Tianjin (CN); Guocheng Liu, Tianjin (CN); Zhenyu Tu, Tianjin (CN); Haihua Li, Tianjin (CN)

(73) Assignee: TIANJIN SHENLAN CHEMICAL TECHNOLOGY CO., LTD, Tianjin (CN)

( * ) Notice: Subject to any disclaimer, the term of this patent is extended or adjusted under 35 U.S.C. 154(b) by 0 days.

(21) Appl. No.: 19/002,899

(22) Filed: Dec. 27, 2024

(65) Prior Publication Data
US 2025/0196020 A1    Jun. 19, 2025

Related U.S. Application Data

(63) Continuation of application No. PCT/CN2024/107205, filed on Jul. 24, 2024.

(30) Foreign Application Priority Data

Dec. 17, 2023 (CN) .......................... 202311738625.3

(51) Int. Cl.
*C07C 29/80* (2006.01)
*B01D 3/14* (2006.01)
(Continued)

(52) U.S. Cl.
CPC .............. *B01D 3/146* (2013.01); *B01D 3/14* (2013.01); *B01D 3/16* (2013.01); *B01D 3/32* (2013.01);
(Continued)

(58) Field of Classification Search
CPC . C07C 29/80–84; C07C 31/12; C07C 31/125; C07C 29/14; C07C 29/141; C07C 29/16
See application file for complete search history.

(56) References Cited

U.S. PATENT DOCUMENTS

| 2,564,200 A | * | 8/1951 | Grekel | .................... C07C 45/84 |
| | | | | 568/918 |
| 2,779,802 A | * | 1/1957 | Harlan, Jr. | .............. C07C 29/16 |
| | | | | 568/451 |

(Continued)

FOREIGN PATENT DOCUMENTS

| CN | 102267873 A | 12/2011 |
| CN | 104557457 A | 4/2015 |

(Continued)

*Primary Examiner* — Jonathan Luke Pilcher
(74) *Attorney, Agent, or Firm* — Rondaus PLLC; George Liu

(57) ABSTRACT

The present disclosure provides an equipment for production of butanol and octanol and a triple-effect distillation method, comprising two processes: butanol separation and octanol separation, both processes use same feedstocks to obtain n-butanol, iso-butanol and octanol products through different procedures, respectively, wherein butanol separation process is sequentially divided into hydrogenation, removal of light and heavy components and separation of isomeric; and octanol separation process is sequentially divided into separation of isomeric, hydrogenation and removal of light and heavy components; the removal of light and heavy components for butanol is carried out by a butanol pre-distillation column and a butanol distillation column, and the separation of isomeric for butanol is carried out by a first butanol isomer column and a second butanol isomer column; and the separation of isomeric for octanol is carried out by a first butyraldehyde isomer column and a second butyraldehyde isomer column.

2 Claims, 1 Drawing Sheet

(51) Int. Cl.
*B01D 3/16* (2006.01)
*B01D 3/32* (2006.01)
*C07C 29/14* (2006.01)
*C07C 29/16* (2006.01)
*C07C 31/12* (2006.01)
*C07C 31/125* (2006.01)

(52) U.S. Cl.
CPC .............. *C07C 29/14* (2013.01); *C07C 29/16* (2013.01); *C07C 29/80* (2013.01); *C07C 31/12* (2013.01); *C07C 31/125* (2013.01)

(56) References Cited

U.S. PATENT DOCUMENTS

| | | | | |
|---|---|---|---|---|
| 2,793,236 | A * | 5/1957 | Habeshaw | C07C 29/141 |
| | | | | 568/451 |
| 2,821,559 | A * | 1/1958 | Habeshaw | C07C 45/50 |
| | | | | 568/877 |
| 3,689,371 | A * | 9/1972 | Kerber et al. | B01D 3/146 |
| | | | | 203/99 |
| 3,763,247 | A * | 10/1973 | Lemke et al. | C07C 29/82 |
| | | | | 560/247 |
| 5,865,957 | A | 2/1999 | Ueda et al. | |
| 6,265,619 | B1 * | 7/2001 | de Rijke | C07C 45/72 |
| | | | | 562/512 |
| 10,118,880 | B2 * | 11/2018 | Sanz Yague | B01J 23/72 |
| 10,562,833 | B2 * | 2/2020 | Fridag | C07C 45/74 |
| 10,577,297 | B2 * | 3/2020 | Fridag | C07C 29/82 |
| 2021/0078924 | A1 | 3/2021 | Archibald et al. | |

FOREIGN PATENT DOCUMENTS

| | | |
|---|---|---|
| CN | 204848703 U | 12/2015 |
| CN | 105964007 A | 9/2016 |
| CN | 108276250 A | 7/2018 |
| CN | 217961351 U | 12/2022 |
| CN | 117563262 A | 2/2024 |
| CN | 221846116 A | 10/2024 |

* cited by examiner

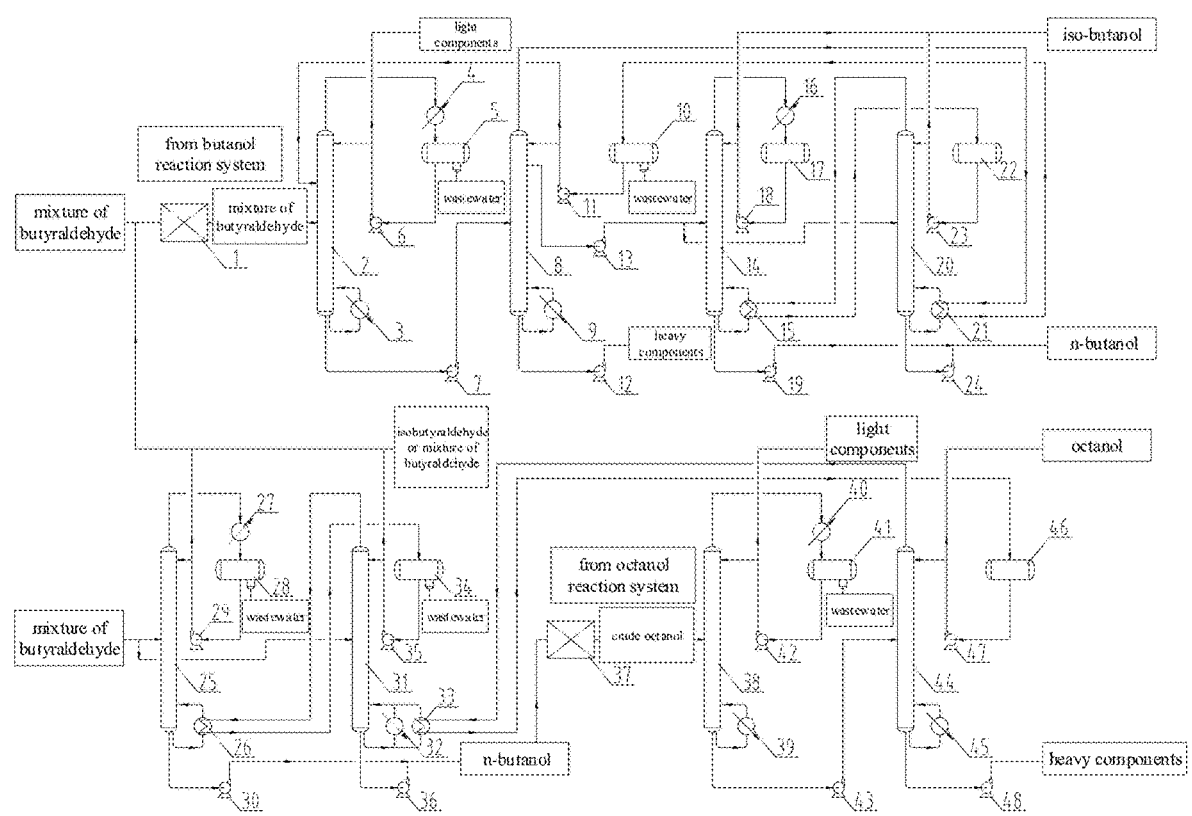

EQUIPMENT FOR PRODUCTION OF BUTANOL AND OCTANOL AND TRIPLE-EFFECT DISTILLATION METHOD

TECHNICAL FIELD

The present disclosure relates to an equipment for production of butanol and octanol and a triple-effect distillation method.

BACKGROUND

Butanol and octanol can be produced using a similar synthetic method in the same set of equipment. Butanol and octanol are important feedstock for the synthesis of fine chemical products, primarily used in the production of plasticizers, solvents, dehydrating agents, defoamers, dispersants, flotation agents, petroleum additives, synthetic fragrances, etc. The downstream consumption of butanol is mainly for butyl acrylate, butyl acetate, and dibutyl phthalate (DBP). The downstream consumption of octanol is mainly for dioctyl phthalate (DOP), dioctyl terephthalate (DOTP), and octyl acrylate.

Butanol and octanol have experienced rapid development with the advancement of petrochemicals, polyvinyl chloride (PVC) material industry, and oxo-synthesis technology. The industrial production methods of butanol and octanol mainly include acetaldehyde condensation, fermentation, Ziegler process, and oxo-synthesis. Among them, oxo-synthesis is currently the predominant technology for the industrial production of butanol and octanol.

The separation process for production of butanol and octanol through propylene oxo-synthesis involves: (1) Performing propylene hydroformylation to refine the crude aldehyde to obtain n-butyraldehyde and iso-butyraldehyde; (2) Hydrogenating n-butyraldehyde and iso-butyraldehyde to produce n-butanol and iso-butanol products; (3) Condensing and subsequently hydrogenating n-butyraldehyde to obtain octanol products. The propylene oxo synthesis method is further divided into high-pressure, medium-pressure, and low-pressure methods. The low-pressure oxo synthesis Davy process for producing butanol and octanol was industrialized in the mid-1970s. This new technology was jointly developed by Union Carbide Corporation in the United States, Davy Company in the United Kingdom, and Johnson Matthey Company in the United Kingdom. Subsequently, Union Carbide and Davy Company developed the fourth-generation low-pressure liquid-phase oxo synthesis process known as the 'UCC/Davy MK-IV' process.

The low-pressure butanol and octanol technology utilize a low-pressure carbonyl process to produce n-butyraldehyde and iso-butyraldehyde using propylene and synthesis gas (a mixture of hydrogen and carbon monoxide). Over the past 30 years, Davy's technology has been jointly marketed with Dow Chemical Company, providing technology transfer and services for the low-pressure butanol and octanol process. To date, this technology has been transferred to 29 projects in 15 countries and regions across four continents. The low-pressure butanol and octanol technology is considered a world-leading transferable technology for butanol and octanol production, accounting for over 85% of the global butanol and octanol production that is produced through technology transfer and uses propylene as the feedstock.

The low-pressure butanol and octanol technology demonstrates significant advantages in each reaction stage. However, in the subsequent separation processes, such as butyraldehyde separation, butanol separation, and octanol separation, each column has a high operating temperature and a large temperature difference within it, and with no heat exchange between them. As a result, the energy consumption is high. Therefore, it is necessary to implement technical improvements in the subsequent separation processes to save energy.

The reaction liquid in the butanol and octanol plant is distilled to obtain butanol and octanol. Most existing production facilities employ processes such as the removal of light and heavy components and separation of n-butanol and iso-butanol. The heat source and refrigerant used are from external utility systems, and there is no heat exchange between columns, resulting in high energy consumption and consequently high production costs. Reducing energy consumption has become a key focus for process improvement.

SUMMARY

To address the shortcomings in the prior art, the technical problem that the present disclosure aims to solve is to provide an equipment for production of butanol and octanol and a triple-effect distillation method. The proposed method achieves lower energy consumption by enabling heat exchange between columns, significantly reducing production costs.

The technical solution adopted by the present disclosure to address the aforementioned technical problem is as follows:

In the first aspect, the present disclosure provides an equipment for production of butanol and octanol, wherein the equipment comprises eight columns: a butanol pre-distillation column 2, a butanol distillation column 8, a first butanol isomer column 14, a second butanol isomer column 20, a first butyraldehyde isomer column 25, a second butyraldehyde isomer column 31, an octanol pre-distillation column 38 and an octanol distillation column 44; and each column is equipped with a corresponding condenser, a reflux phase separation tank and a reboiler;

a feed inlet of the butanol pre-distillation column 2 is connected to an outlet of a butanol reaction system 1;

a bottom outlet of the butanol pre-distillation column 2 is connected to a feed of the butanol distillation column 8, and a top reflux of the butanol pre-distillation column 2 is taken out as light components;

a bottom of the butanol distillation column 8 takes out heavy components, and a top gas phase of the butanol distillation column 8 is connected to a heat exchange inlet of the reboiler at a bottom of the second butanol isomer column 20, and a heat exchange outlet of the reboiler at the bottom of the second butanol isomer column 20 is connected to the reflux phase separation tank set at the top of the butanol distillation column 8 for reflux at the top of the butanol distillation column 8; at the same time, a reflux material from the top of the butanol distillation column 8 is connected to the feed inlet of the butanol pre-distillation column 2 via a pipeline;

a side outlet of the butanol distillation column 8 is connected to the first butanol isomer column 14 and the second butanol isomer column 20, respectively;

the reboiler at a bottom of the first butanol isomer column 14 is connected to a top of the second butanol isomer column 20 for heat exchange, and both the bottom of the first butanol isomer column 14 and the bottom of the second butanol isomer column 20 take out n-butanol;

a portion of the reflux material condensed at the top of the first butanol isomer column 14 is connected to a top inlet of the first butanol isomer column 14 via the pipeline, and another portion is taken out as iso-butanol;

a portion of the reflux material condensed at the top of the second butanol isomer column 20 is connected to a top inlet of the second butanol isomer column 20 via the pipeline, and another portion is taken out as iso-butanol;

a feed for both the first butyraldehyde isomer column 25 and the second butyraldehyde isomer column 31 is a mixture of butyraldehyde derived from propylene carbonylation reaction, and reflux outlets at tops of the first butyraldehyde isomer column 25 and the second butyraldehyde isomer column 31 are iso-butyraldehyde or the mixture of butyraldehyde, which can also be connected to a feed inlet of the butanol reaction system 1;

the reboiler at a bottom of the first butyraldehyde isomer column 25 is connected to a top of the second butyraldehyde isomer column 31 for heat exchange, and bottom outlets of both the first butyraldehyde isomer column 25 and the second butyraldehyde isomer column 31 are processed through an octanol reaction system 37 before being connected to a feed inlet of the octanol pre-distillation column 38;

the reboiler at the bottom of the second butyraldehyde isomer column 31 exchanges heat with a top of the octanol distillation column 44;

a portion of the reflux material condensed at a top of the octanol pre-distillation column 38 is connected to a top inlet of the octanol pre-distillation column 38 via the pipeline, and another portion is taken out as the light components; and a bottom outlet of the octanol pre-distillation column 38 is connected to a feed inlet of the octanol distillation column 44, a bottom of the octanol distillation column 44 takes out the heavy components, and after condensation reflux at the top, octanol is taken out.

Furthermore, the second butyraldehyde isomer column 31 is equipped with two parallel reboilers, one is a first reboiler of the second butyraldehyde isomer column 32, which uses steam as a heat source for the reboiler; another one is a second reboiler of the second butyraldehyde isomer column 33, which uses the top gas phase from the octanol distillation column 44 as the heat source, and a feed for the butanol reaction system 1 is the mixture of butyraldehyde from propylene hydroformylation reaction.

The second aspect of the present disclosure provides a butanol separation device, wherein the butanol separation device comprises a butanol pre-distillation column 2, a butanol distillation column 8, a first butanol isomer column 14 and a second butanol isomer column 20; and each column is equipped with a corresponding condenser, a reflux phase separation tank and a reboiler;

a feed inlet of the butanol pre-distillation column 2 is connected to an outlet of a butanol reaction system 1, and the main component of the outlet is a mixture of butanol;

a bottom outlet of the butanol pre-distillation column 2 is connected to a feed of the butanol distillation column 8, and a top reflux of the butanol pre-distillation column 2 is taken out as light components;

a bottom of the butanol distillation column 8 takes out heavy components, and a top gas phase of the butanol distillation column 8 is connected to a heat exchange inlet of the reboiler at a bottom of the second butanol isomer column 20, and a heat exchanger outlet of the reboiler at the bottom of the second butanol isomer column 20 is connected to the reflux phase separation tank set at the top of the butanol distillation column 8 for reflux at the top of the butanol distillation column 8; at the same time, a reflux material from the top of the butanol distillation column 8 is connected to the feed inlet of the butanol pre-distillation column 2 via a pipeline;

a side outlet of the butanol distillation column 8 is connected to the first butanol isomer column 14 and the second butanol isomer column 20, respectively;

the reboiler at a bottom of the first butanol isomer column 14 is connected to a top of the second butanol isomer column 20 for heat exchange, and both the bottom of the first butanol isomer column 14 and the bottom of the second butanol isomer column 20 take out n-butanol;

a portion of the reflux material condensed at the top of the first butanol isomer column 14 is connected to a top inlet of the first butanol isomer column 14 via the pipeline, and another portion is taken out as iso-butanol; and a portion of the reflux material condensed at the top of the second butanol isomer column 20 is connected to a top inlet of the second butanol isomer column 20 via the pipeline, and another portion is taken out as iso-butanol.

The third aspect of the present disclosure provides an octanol separation device, wherein the octanol separation device comprises a first butyraldehyde isomer column 25, a second butyraldehyde isomer column 31, an octanol pre-distillation column 38 and an octanol distillation column 44;

a feed for both the first butyraldehyde isomer column 25 and the second butyraldehyde isomer column 31 is a mixture of butyraldehyde derived from propylene carbonylation reaction, and reflux outlets at tops of the first butyraldehyde isomer column 25 and the second butyraldehyde isomer column 31 are iso-butyraldehyde or the mixture of butyraldehyde;

a reboiler at a bottom of the first butyraldehyde isomer column 25 is connected to a top of the second butyraldehyde isomer column 31 for heat exchange, and bottom outlets of both the first butyraldehyde isomer column 25 and the second butyraldehyde isomer column 31 are processed through an octanol reaction system 37 before being connected to a feed inlet of the octanol pre-distillation column 38;

a reboiler at a bottom of the second butyraldehyde isomer column 31 exchanges heat with a top of the octanol distillation column 44;

a portion of a reflux material condensed at a top of the octanol pre-distillation column 38 is connected to a top inlet of the octanol pre-distillation column 38 via a pipeline, and another portion is taken out as light components; and a bottom outlet of the octanol pre-distillation column 38 is connected to a feed inlet of the octanol distillation column 44, a bottom of the octanol distillation column 44 takes out heavy components, and after condensation reflux at the top, octanol is taken out.

The fourth aspect of the present disclosure provides a triple-effect distillation method for production of butanol and octanol, comprising two processes: butanol separation and octanol separation, both processes use same feedstocks to obtain n-butanol, iso-butanol and octanol products through different procedures, respectively, wherein butanol separation process is sequentially divided into hydrogenation, removal of light and heavy components and separation of isomeric; and octanol separation process is sequentially divided into separation of isomeric, hydrogenation and removal of light and heavy components;

the removal of light and heavy components for butanol is carried out by a butanol pre-distillation column 2 and a butanol distillation column 8, and the separation of isomeric for butanol is carried out by a first butanol isomer column 14 and a second butanol isomer column 20; and the separation of isomeric for octanol is carried out by a first butyraldehyde isomer column 25 and a second butyraldehyde isomer column 31, and the removal of light and heavy components for octanol is carried out by an octanol pre-distillation column 38 and an octanol distillation column 44;

a mixture of n-butyraldehyde and iso-butyraldehyde serves as the feedstock entering the butanol separation process and/or the octanol separation process;

in the butanol separation process, the mixture of n-butyraldehyde and iso-butyraldehyde is hydrogenated as a whole to obtain a mixture of n-butanol and iso-butanol, namely crude butanol; the crude butanol is first separated in the butanol pre-distillation column 2 to remove light components and then in the butanol distillation column 8 to remove light components, heavy components and impurities, subsequently, the mixture is sent through two isobutanol separation columns at different pressures to separate n-butanol and iso-butanol, resulting in the production of n-butanol and iso-butanol; and the pressure settings for the first butanol isomer column 14 and the second butanol isomer column 20 are adjusted to balance energy consumption and separation efficiency;

in the octanol separation process, the mixture of n-butyraldehyde and iso-butyraldehydes is subjected to separation in two first butyraldehyde isomer columns at different pressures to separate n-butyraldehyde and iso-butyraldehyde, and the n-butyraldehyde is then hydrogenated to obtain crude octanol; the crude octanol is finally separated in the octanol pre-distillation column 38 and the octanol distillation column 44 to remove light components, heavy components and impurities, resulting in the production of octanol; and the isomerization columns, the first butyraldehyde isomer column 25 and the second butyraldehyde isomer column 31 operate at different pressures, wherein one is a higher-pressure column and another is a lower-pressure column, the higher-pressure column having a higher temperature, and a top temperature of the higher-pressure column is higher than a bottom temperature of the lower-pressure column, thereby creating a temperature difference;

a top gas phase of the butanol distillation column 8 serves as a heat source for the second butanol isomer column 20, and a top gas phase of the second butanol isomer column 20 serves as a heat source for the first butanol isomer column 14; and a top gas phase of the octanol distillation column 44 serves as a portion of the heat source for the reboiler of the second butyraldehyde isomer column 31, and a top gas phase of the second butyraldehyde isomer column 31 serves as the heat source for the reboiler of the first butyraldehyde isomer column 25;

a top temperature of the butanol distillation column 8 is higher than a bottom temperature of the second butanol isomer column 20, and a top temperature of the second butanol isomer column 20 is higher than a bottom temperature of the first butanol isomer column 14;

a top temperature of the octanol distillation column 44 is higher than a bottom temperature of the second butyraldehyde isomer column 31, and a top temperature of the second butyraldehyde isomer column 31 is higher than a bottom temperature of the first butyraldehyde isomer column 25; and a temperature difference between each pair is greater than or equal to 5° C.

The temperature difference between each pair ranges from 5° C. to 50° C., with a preference for a temperature difference of 10° C. to 30° C.

A top pressure of the butanol pre-distillation column 2 ranges from atmospheric pressure to 100 kPa (Gauge Pressure) (G), a top temperature ranges from 70° C. to 140° C., and a bottom temperature ranges from 100° C. to 170° C.;

a top pressure of the butanol distillation column 8 ranges from atmospheric pressure to 100 kPa (G), a top temperature ranges from 90° C. to 170° C., and a bottom temperature ranges from 110° C. to 190° C.;

a top pressure of the first butanol isomer column 14 ranges from −100 kPa (G) to atmospheric pressure, a top temperature ranges from 20° C. to 100° C., and a bottom temperature ranges from 40° C. to 120° C.;

a top pressure of the second butanol isomer column 20 ranges from −60 kPa (G) to 40 kPa (G), a top temperature ranges from 60° C. to 140° C., and a bottom temperature ranges from 80° C. to 160° C.;

a top pressure of the first butyraldehyde isomer column 25 ranges from −100 kPa (G) to atmospheric pressure, a top temperature ranges from 20° C. to 100° C., and a bottom temperature ranges from 40° C. to 120° C.;

a top pressure of the second butyraldehyde isomer column 31 ranges from atmospheric pressure to 200 kPa (G), a top temperature ranges from 40° C. to 140° C., and a bottom temperature ranges from 60° C. to 160° C.;

a top pressure of the octanol pre-distillation column 38 ranges from −100 kPa (G) to atmospheric pressure, a top temperature ranges from 60° C. to 140° C., and a bottom temperature ranges from 100° C. to 180° C.; and a top pressure of the octanol distillation column 44 ranges from −100 kPa (G) to atmospheric pressure, a top temperature ranges from 90° C. to 160° C., and a bottom temperature ranges from 110° C. to 190° C.

Each column is either a plate column or a packed column, and flow parameter values (FP values) for each column ranges from 0.02 to 0.2; and when the column is the packed column, internals comprise packing, packing support rings and liquid distributors.

The feedstock is either a mixture of butyraldehyde produced from propylene carbonylation reaction or a mixture mainly consisting of n-butyraldehyde and iso-butyraldehyde; a mass percentage composition range of the feedstock is as follows: the mixture of n-butyraldehyde and iso-butyraldehyde accounts for 90% to 100%, light components account for 0% to 4%, and heavy components account for 0% to 6%; and a ratio of n-butanol to iso-butanol is between 1:1 and 15:1.

Compared with the prior art, the beneficial effects of the present disclosure are as follows:
1. In the present disclosure, the separation processes for butanol and octanol are separated, allowing for a certain degree of flexibility in adjusting the ratio of butanol to octanol in the reaction. This enables better adaptation to market demands. The separation processes for butanol and octanol each undergo a triple-effect energy-saving heat exchange design, significantly reducing energy consumption. This overcomes the issue encountered in conventional butanol and octanol separation processes, where the heat source and refrigerant required for distillation column production are conventionally heated or cooled directly using conventional heat sources and refrigerants, leading to ineffective utilization of the waste heat from the top gas phase.

2. In the present disclosure, the top gas phase of the butanol distillation column is used as a heat source for the reboiler of the second butanol isomer column, and the top gas phase of the octanol distillation column is used as a heat source for the reboiler of the second butyraldehyde isomer column. By fully utilizing the heat from these two high-temperature streams, the need for additional heat sources in the second butanol isomer column is eliminated, thereby reducing the overall energy consumption of the process.

3. In the method of the present disclosure, the isobutanol separation column and the first butyraldehyde isomer column, originally based on the single-column process of the Davy process, are transformed into a double-column thermal coupling process. Different heat-coupling heat exchange processes are designed, dividing one column into two columns. These two columns have identical functions but are operated under different conditions. The column with higher pressure has a higher temperature, while the column with lower pressure has a lower temperature. Additionally, the column with higher pressure has a top temperature higher than the bottom temperature of the column with lower pressure, with a certain temperature difference existing between them, allowing for heat exchange between these two columns. The column pressure of the first butanol isomer column and the first butyraldehyde isomer column, originally based on the micro-positive pressure of the Davy process, are changed to a reduced pressure, reducing the operating temperature of the entire column. The top gas phase of the second butanol isomer column is used as a heat source for the reboiler of the first butanol isomer column, while the top gas phase of the second butyraldehyde isomer column is used as a heat source for the reboiler of the first butyraldehyde isomer column. This eliminates the need for additional heat sources in the first butanol isomer column and the first butyraldehyde isomer column, thereby reducing the overall energy consumption of the process. The existing Davy process involves using micro-positive pressure for the isobutanol separation column and the first butyraldehyde isomer column (with the isobutanol separation column typically operating at around 20-40 kPa (G) and the first butyraldehyde isomer column at around 40-60 kPa (G)). This results in elevated temperatures throughout the column and creates significant energy consumption issues. Additionally, considering the need for separating normal and isomer, both columns are typically very tall, further exacerbating energy consumption. The present disclosure can well avoid these problems.

4. In the Davy process, the working conditions of each column are not deliberately controlled to create temperature differences; typically, the bottom temperature of the column is high while the top temperature is low. In the present disclosure, for different processes, each column is redesigned based on its specific design objectives and operating conditions. The aim is to explore more energy-saving operating conditions while satisfying the separation effect. By controlling the column pressure, a systematic temperature difference is created between the columns (the top temperature of the butanol distillation column is higher than the bottom temperature of the second butanol isomer column, and the top temperature of the second butanol isomer column is higher than the bottom temperature of the first butanol isomer column; the top temperature of the octanol distillation column is higher than the bottom temperature of the second butyraldehyde isomer column, and the top temperature of the second butyraldehyde isomer column is higher than the bottom temperature of the first butyraldehyde isomer column; and the temperature difference between each pair is greater than or equal to 5° C.), enabling the construction of a heat exchange network based on different temperature differentials. This lays the foundation for energy-saving optimization design for the entire system.

5. The embodiments of the present disclosure have been rearranged from the column internals to the working conditions of each column. In the Davy process, constrained by the era and technological limitations, the columns use plate column structures, and the internals used are trays, resulting in high pressure drop and elevated bottom temperatures in the entire column. The column internals in the present disclosure replace the trays used in the Davy process with packing, significantly reducing the overall pressure drop and further lowering the bottom temperature, thereby laying the foundation for the subsequent design of triple-effect heat exchange. The present disclosure enables triple-effect heat exchange with low energy consumption, reasonable design, and simple operation. Compared to other industrial energy-saving designs, this method requires less investment, is practical and reliable, and yields significant results. Compared to the Davy process, the energy-saving potential of the present disclosure's process is approximately 40-60%.

BRIEF DESCRIPTION OF THE DRAWINGS

FIG. 1 depicts the process flow diagram of the triple-effect distillation method for production of butanol and octanol in the present disclosure.

In the FIGURE, 1—butanol reaction system; 2—butanol pre-distillation column; 3—butanol pre-distillation column reboiler; 4—butanol pre-distillation column condenser; 5—butanol pre-distillation column reflux phase separation tank; 6—butanol pre-distillation column reflux pump; 7—butanol pre-distillation column bottom pump; 8—butanol distillation column; 9—butanol distillation column reboiler; 10—butanol distillation column reflux phase separation tank; 11—butanol distillation column reflux pump; 12—butanol distillation column bottom pump; 13—butanol distillation column side stream pump; 14—first butanol isomer column; 15—first butanol isomer column reboiler; 16—first butanol isomer column condenser; 17—first butanol isomer column reflux tank; 18—first butanol isomer column reflux pump; 19—first butanol isomer column bottom pump; 20—second butanol isomer column; 21—second butanol isomer column reboiler; 22—second butanol isomer column reflux tank; 23—second butanol isomer column reflux pump; 24—second butanol isomer column bottom pump; 25—first butyraldehyde isomer column; 26—first butyraldehyde isomer column reboiler; 27—first butyraldehyde isomer column condenser; 28—first butyraldehyde isomer column reflux phase separation tank; 29—first butyraldehyde isomer column reflux pump; 30—first butyraldehyde isomer column bottom pump; 31—second butyraldehyde isomer column; 32—first reboiler of the second butyraldehyde isomer column; 33—second reboiler of the second butyraldehyde isomer column; 34—second butyraldehyde isomer column reflux phase separation tank; 35—second butyraldehyde isomer column reflux pump; 36—second butyraldehyde isomer column bottom pump; 37—octanol reaction system; 38—octanol pre-distillation column; 39—octanol pre-distillation column reboiler; 40—octanol pre-distillation column condenser; 41—octanol pre-distillation column reflux phase separation tank; 42—octanol pre-distillation column reflux pump; 43—octanol pre-distillation column bottom pump; 44—octanol distillation column; 45—octanol distillation column reboiler; 46—octanol distillation column reflux tank; 47—octanol distillation column reflux pump; 48—octanol distillation column bottom pump.

DETAILED DESCRIPTION OF THE EMBODIMENTS

The present disclosure is further explained below with reference to the embodiments and the accompanying drawings, but is not intended to limit the scope of protection of the present disclosure.

The present disclosure provides an equipment for production of butanol and octanol, as shown in FIG. 1, wherein the equipment comprises eight columns: a butanol pre-distillation column 2, a butanol distillation column 8, a first butanol isomer column 14, a second butanol isomer column 20, a first butyraldehyde isomer column 25, a second butyraldehyde isomer column 31, an octanol pre-distillation column 38 and an octanol distillation column 44; and each column is equipped with a corresponding condenser, a reflux phase separation tank and a reboiler;

a feed inlet of the butanol pre-distillation column 2 is connected to an outlet of a butanol reaction system 1, and a feed of the butanol reaction system is a mixture of butyraldehyde derived from propylene carbonylation reaction;

a bottom outlet of the butanol pre-distillation column 2 is connected to a feed of the butanol distillation column 8, and a top reflux of the butanol pre-distillation column 2 is taken out as light components;

a bottom of the butanol distillation column 8 takes out heavy components, and a top gas phase of the butanol distillation column 8 is connected to a heat exchange inlet of the reboiler at a bottom of the second butanol isomer column 20, and a heat exchange outlet of the reboiler at the bottom of the second butanol isomer column 20 is connected to the reflux phase separation tank set at the top of the butanol distillation column 8 for reflux at the top of the butanol distillation column 8; at the same time, a reflux material from the top of the butanol distillation column 8 is connected to the feed inlet of the butanol pre-distillation column 2 via a pipeline;

a side outlet of the butanol distillation column 8 is connected to the first butanol isomer column 14 and the second butanol isomer column 20, respectively;

the reboiler at a bottom of the first butanol isomer column 14 is connected to a top of the second butanol isomer column 20 for heat exchange, and both the bottom of the first butanol isomer column 14 and the bottom of the second butanol isomer column 20 take out n-butanol;

a portion of the reflux material condensed at the top of the first butanol isomer column 14 is connected to a top inlet of the first butanol isomer column 14 via the pipeline, and another portion is taken out as iso-butanol;

a portion of the reflux material condensed at the top of the second butanol isomer column 20 is connected to a top inlet of the second butanol isomer column 20 via the pipeline, and another portion is taken out as iso-butanol;

a feed for both the first butyraldehyde isomer column 25 and the second butyraldehyde isomer column 31 is a mixture of butyraldehyde derived from propylene carbonylation reaction, and reflux outlets at tops of the first butyraldehyde isomer column 25 and the second butyraldehyde isomer column 31 are iso-butyraldehyde or the mixture of butyraldehyde, which can also be connected to a feed inlet of the butanol reaction system 1;

the reboiler at a bottom of the first butyraldehyde isomer column 25 is connected to a top of the second butyraldehyde isomer column 31 for heat exchange, and bottom outlets of both the first butyraldehyde isomer column 25 and the second butyraldehyde isomer column 31 are processed through an octanol reaction system 37 before being connected to a feed inlet of the octanol pre-distillation column 38;

the reboiler at the bottom of the second butyraldehyde isomer column 31 exchanges heat with a top of the octanol distillation column 44;

a portion of the reflux material condensed at a top of the octanol pre-distillation column 38 is connected to a top inlet of the octanol pre-distillation column 38 via the pipeline, and another portion is taken out as the light components; and a bottom outlet of the octanol pre-distillation column 38 is connected to a feed inlet of the octanol distillation column 44, a bottom of the octanol distillation column 44 takes out the heavy components, and after condensation reflux at the top, octanol is taken out.

Furthermore, the second butyraldehyde isomer column 31 is equipped with two parallel reboilers, one is a first reboiler of the second butyraldehyde isomer column 32, which uses steam as a heat source for the reboiler; and another one is a second reboiler of the second butyraldehyde isomer column 33, which uses the top gas phase from the octanol distillation column 44 as the heat source, The present disclosure provides a butanol separation device, wherein the butanol separation device comprises a butanol pre-distillation column 2, a butanol distillation column 8, a first butanol isomer column 14 and a second butanol isomer column 20; and each column is equipped with a corresponding condenser, a reflux phase separation tank and a reboiler;

a feed inlet of the butanol pre-distillation column 2 is connected to an outlet of a butanol reaction system 1, and the main component of the outlet is a mixture of butanol;

a bottom outlet of the butanol pre-distillation column 2 is connected to a feed of the butanol distillation column 8, and a top reflux of the butanol pre-distillation column 2 is taken out as light components;

a bottom of the butanol distillation column 8 takes out heavy components, and a top gas phase of the butanol distillation column 8 is connected to a heat exchange inlet of the reboiler at a bottom of the second butanol isomer column 20, and a heat exchanger outlet of the reboiler at the bottom of the second butanol isomer column 20 is connected to the reflux phase separation tank set at the top of the butanol distillation column 8 for reflux at the top of the butanol distillation column 8; at the same time, a reflux material from the top of the butanol distillation column 8 is connected to the feed inlet of the butanol pre-distillation column 2 via a pipeline;

a side outlet of the butanol distillation column 8 is connected to the first butanol isomer column 14 and the second butanol isomer column 20, respectively;

the reboiler at a bottom of the first butanol isomer column 14 is connected to a top of the second butanol isomer column 20 for heat exchange, and both the bottom of the first butanol isomer column 14 and the bottom of the second butanol isomer column 20 take out n-butanol;

a portion of the reflux material condensed at the top of the first butanol isomer column 14 is connected to a top inlet of the first butanol isomer column 14 via the pipeline, and another portion is taken out as iso-butanol; and a portion of the reflux material condensed at the top of the second butanol isomer column 20 is connected to a top inlet of the second butanol isomer column 20 via the pipeline, and another portion is taken out as iso-butanol.

The present disclosure provides an octanol separation device, wherein the octanol separation device comprises a first butyraldehyde isomer column 25, a second butyraldehyde isomer column 31, an octanol pre-distillation column 38 and an octanol distillation column 44; and each column is equipped with a corresponding condenser, a reflux phase separation tank and a reboiler;

a feed for both the first butyraldehyde isomer column 25 and the second butyraldehyde isomer column 31 is a mixture of butyraldehyde derived from propylene carbonylation reaction, and reflux outlets at tops of the first butyraldehyde isomer column 25 and the second butyraldehyde isomer column 31 are iso-butyraldehyde or the mixture of butyraldehyde;

a reboiler at a bottom of the first butyraldehyde isomer column 25 is connected to a top of the second butyraldehyde isomer column 31 for heat exchange, and bottom outlets of both the first butyraldehyde isomer column 25 and the second butyraldehyde isomer column 31 are processed through an octanol reaction system 37 before being connected to a feed inlet of the octanol pre-distillation column 38;

a reboiler at a bottom of the second butyraldehyde isomer column 31 exchanges heat with a top of the octanol distillation column 44;

a portion of a reflux material condensed at a top of the octanol pre-distillation column 38 is connected to a top inlet of the octanol pre-distillation column 38 via a pipeline, and another portion is taken out as light components; and a bottom outlet of the octanol pre-distillation column 38 is connected to a feed inlet of the octanol distillation column 44, a bottom of the octanol distillation column 44 takes out heavy components, and after condensation reflux at the top, octanol is taken out.

The present disclosure provides a triple-effect distillation method for production of butanol and octanol, comprising two processes: butanol separation and octanol separation, both processes use same feedstocks to obtain n-butanol, iso-butanol and octanol products through different procedures, respectively, wherein butanol separation process is sequentially divided into hydrogenation, removal of light and heavy components and separation of isomeric; and octanol separation process is sequentially divided into separation of isomeric, hydrogenation and removal of light and heavy components;

the removal of light and heavy components for butanol is carried out by a butanol pre-distillation column 2 and a butanol distillation column 8, and the separation of isomeric for butanol is carried out by a first butanol isomer column 14 and a second butanol isomer column 20; and the separation of isomeric for octanol is carried out by a first butyraldehyde isomer column 25 and a second butyraldehyde isomer column 31, and the removal of light and heavy components for octanol is carried out by an octanol pre-distillation column 38 and an octanol distillation column 44;

a mixture of n-butyraldehyde and iso-butyraldehyde serves as the feedstock entering the butanol separation process and/or the octanol separation process;

in the butanol separation process, the mixture of n-butyraldehyde and iso-butyraldehyde is hydrogenated as a whole to obtain a mixture of n-butanol and iso-butanol, namely crude butanol; the crude butanol is first separated in the butanol pre-distillation column 2 to remove light components and then in the butanol distillation column 8 to remove light components, heavy components and impurities, subsequently, the mixture is sent through two isobutanol separation columns at different pressures (the pressure settings for the first butanol isomer column 14 and the second butanol isomer column 20 are adjusted to balance energy consumption and separation efficiency) to separate n-butanol and iso-butanol, resulting in the production of n-butanol and iso-butanol;

in the octanol separation process, the mixture of n-butyraldehyde and iso-butyraldehydes is subjected to separation in two first butyraldehyde isomer columns at different pressures (the isomerization columns, the first butyraldehyde isomer column 25 and the second butyraldehyde isomer column 31 operate at different pressures, wherein one is a higher-pressure column and another is a lower-pressure column, the higher-pressure column having a higher temperature, and a top temperature of the higher-pressure column is higher than a bottom temperature of the lower-pressure column, thereby creating a temperature difference for heat exchange) to separate n-butyraldehyde and iso-butyraldehyde, and the n-butyraldehyde is then hydrogenated to obtain crude octanol; the crude octanol is finally separated in the octanol pre-distillation column 38 and the octanol distillation column 44 to remove light components, heavy components and impurities, resulting in the production of octanol;

a top gas phase of the butanol distillation column 8 serves as a heat source for the second butanol isomer column 20, and a top gas phase of the second butanol isomer column 20 serves as a heat source for the first butanol isomer column 14; and a top gas phase of the octanol distillation column 44 serves as a portion of the heat source for the reboiler of the second butyraldehyde isomer column 31, and a top gas phase of the second butyraldehyde isomer column 31 serves as the heat source for the reboiler of the first butyraldehyde isomer column 25. In both the butanol and octanol separation processes, these processes form a triple-effect heat exchange network, which significantly reduces energy consumption. The triple-effect heat exchange network refers to a heat exchange process where three columns are involved in heat exchange in each individual process.

The specific process of triple-effect distillation method for production of butanol and octanol is as follows:

In the butanol separation process:

The mixture of butyraldehyde derived from the propylene carbonylation reaction is processed through butanol reaction system 1, and after overall hydrogenation, a mixture of butanol containing a small amount of impurities is obtained.

The mixture of butanol is sent to the butanol pre-distillation column 2. The butanol pre-distillation column 2 is equipped with a butanol pre-distillation column reboiler 3. The butanol pre-distillation column reboiler 3 utilizes steam as a heat source for the reboiler. The top pressure of the butanol pre-distillation column 2 is atmospheric pressure to 100 kPa (G), where "G" indicates gauge pressure. The top temperature of the column ranges from 70° C. to 140° C., while the bottom temperature ranges from 100° C. to 170° C. The top gas phase of the butanol pre-distillation column 2 enters the butanol pre-distillation column condenser 4 for condensation. The condenser uses circulating water as a refrigerant. The condensed liquid then flows into the butanol pre-distillation column reflux phase separation tank 5. The aqueous phase in the butanol pre-distillation column reflux phase separation tank 5 is discharged from the interface. The organic phase in the butanol pre-distillation column reflux phase separation tank 5 is conveyed by the butanol pre-distillation column reflux pump 6, with a portion returning as reflux to the top of the butanol pre-distillation column 2, while another portion is taken out as light components.

The material from the bottom of the butanol pre-distillation column 2 is conveyed into the butanol distillation column 8 by the butanol pre-distillation column bottom pump 7. The butanol distillation column 8 is equipped with a butanol distillation column reboiler 9, which uses steam as the heat source for the reboiler. The top pressure of the butanol distillation column 8 ranges from atmospheric pressure to 100 kPa (G), a top temperature ranges from 90° C. to 170° C., and a bottom temperature ranges from 110° C. to 190° C. The top gas phase of the butanol distillation column 8 enters the second butanol isomer column reboiler 21 to condense. The condensed liquid then flows into the butanol distillation column reflux phase separation tank 10. The aqueous phase in the butanol distillation column reflux phase separation tank 10 is discharged from the interface, while the organic phase in the butanol distillation column reflux phase separation tank 10 is conveyed by the butanol distillation column reflux pump 11. A portion returns as reflux to the top of the butanol distillation column 8, while another portion, after being extracted as light components, returns to the butanol pre-distillation column 2. The heavy components from the bottom of the butanol distillation column 8 are extracted via the butanol distillation column bottom pump 12. The material extracted from the side stream of the butanol distillation column 8 is split into two streams after being extracted by the butanol distillation column side stream pump 13. One stream enters the first butanol isomer column 14, while the other enters the second butanol isomer column 20.

The first butanol isomer column 14 is equipped with a first butanol isomer column reboiler 15, which utilizes the gas phase from the top of the second butanol isomer column as the heat source for the reboiler. The operating conditions for the top of the first butanol isomer column 14 are a pressure range of −100 kPa (G) to atmospheric pressure, with top temperature ranging from 20° C. to 100° C., while the bottom temperature ranges from 40° C. to 120° C. The gas phase from the top of the first butanol isomer column 14 is condensed in the first butanol isomer column condenser 16, using circulating water as the refrigerant. The condensed liquid flows into the first butanol isomer column reflux tank 17, from where it is pumped by the first butanol isomer column reflux pump 18. Part of the material is returned as reflux to the top of the first butanol isomer column 14, while another portion is taken out as iso-butanol product. The n-butanol product from the bottom of the first butanol isomer column 14 is pumped out by the first butanol isomer column bottom pump 19 and collected in the n-butanol product tank.

The second butanol isomer column 20 is equipped with a second butanol isomer column reboiler 21, which utilizes the gas phase from the top of the butanol distillation column as the heat source for the reboiler. The operating conditions for the second butanol isomer column 20 are as follows: the pressure at the top ranges from −60 kPa (G) to 40 kPa (G), with a top temperature between 60° C. and 140° C., while the bottom temperature ranges from 80° C. to 160° C. The gas phase from the top of the second butanol isomer column 20 is condensed in the first butanol isomer column reboiler 15, with the resulting liquid entering the second butanol isomer column reflux tank 22. The material in the second butanol isomer column reflux tank 22 is conveyed by the second butanol isomer column reflux pump 23, with a portion returning as reflux to the top of the second butanol isomer column 20 and another portion extracted as iso-butanol product. The n-butanol product from the bottom of the second butanol isomer column 20 is pumped out by the second butanol isomer column bottom pump 24 and collected in the n-butanol product tank.

In the Octanol Separation Process:

The mixture of butyraldehyde from the propylene carbonylation reaction is divided into two streams, with one stream entering the first butyraldehyde isomer column 25, and the other stream entering the second butyraldehyde isomer column 31.

The first butyraldehyde isomer column 25 is equipped with a first butyraldehyde isomer column reboiler 26, which utilizes the gas phase from the top of the second butyraldehyde isomer column as the heat source for the reboiler. The operating conditions for the first butyraldehyde isomer column 25 are as follows: the pressure at the top ranges from −100 kPa (G) to atmospheric pressure, with a top temperature between 20° C. and 100° C., while the bottom temperature ranges from 40° C. to 120° C. The gas phase from the top of the first butyraldehyde isomer column 25 is condensed in the first butyraldehyde isomer column condenser 27, using circulating water as the refrigerant. The condensed liquid then flows into the first butyraldehyde isomer column reflux phase separation tank 28. The material in the first butyraldehyde isomer column reflux phase separation tank 28 is conveyed by the first butyraldehyde isomer column reflux pump 29, with a portion returning as reflux to the top of the first butyraldehyde isomer column 25 and another portion extracted as iso-butyraldehyde or mixture of butyraldehyde product. The extracted iso-butyraldehyde or mixture of butyraldehyde product can enter the butanol separation process to participate in subsequent reactions. The material from the bottom of the first butyraldehyde isomer column 25 is conveyed by the first butyraldehyde isomer column bottom pump 30, and n-butyraldehyde is taken out.

The second butyraldehyde isomer column 31 is equipped with two reboilers: one is the first reboiler of the second butyraldehyde isomer column 32, which utilizes steam as its heat source; the other is the second reboiler of the second butyraldehyde isomer column 33, which utilizes the gas phase from the top of the octanol distillation column 44 as its heat source. The operating conditions for the second butyraldehyde isomer column 31 are as follows: the pressure at the top ranges from atmospheric pressure to 200 kPa (G), with a top temperature between 40° C. and 140° C., while the bottom temperature ranges from 60° C. to 160° C. The gas phase from the top of the second butyraldehyde isomer column 31 is condensed in the first butyraldehyde isomer column reboiler 26, with the resulting liquid flowing into the second butyraldehyde isomer column reflux phase separation tank 34. The aqueous phase in the second butyraldehyde isomer column reflux phase separation tank 34 is discharged from the interface, while the organic phase is conveyed by the second butyraldehyde isomer column reflux pump 35. A portion returns as reflux to the top of the second butyraldehyde isomer column 31, while another portion is taken out and stored in the iso-butyraldehyde or mixture of butyraldehyde tank. The material from the bottom of the second butyraldehyde isomer column 31 is conveyed by the second butyraldehyde isomer column bottom pump 36, and n-butyraldehyde is taken out.

The n-butyraldehyde undergoes a condensation and hydrogenation process in the octanol reaction system 37, resulting in a crude octanol product containing a small amount of impurities.

The material from the octanol reaction system is sent to the octanol pre-distillation column 38. The octanol pre-distillation column 38 is equipped with an octanol pre-distillation column reboiler 39, which utilizes steam as its heat source. The operating conditions for the octanol pre-distillation column 38 are as follows: the pressure at the top ranges from −100 kPa (G) to atmospheric pressure, with a top temperature between 60° C. and 140° C., while the bottom temperature ranges from 100° C. to 180° C. The top gas phase of the octanol pre-distillation column 38 is condensed in the octanol pre-distillation column condenser 40, with the resulting liquid flowing into the octanol pre-distillation column reflux phase separation tank 41. The aqueous phase in the octanol pre-distillation column reflux phase separation tank 41 is discharged from the interface, while the organic phase is conveyed by the octanol pre-distillation column reflux pump 42. A portion returns as reflux to the top of the octanol pre-distillation column 38, while another portion is taken out as light components.

The material from the bottom of the octanol pre-distillation column 38 is conveyed to the octanol distillation column 44 by the octanol pre-distillation column bottom pump 43. The octanol distillation column 44 is equipped with an octanol distillation column reboiler 45, which utilizes steam as its heat source. The operating conditions for the octanol distillation column 44 are as follows: the pressure at the top ranges from −100 kPa (G) to atmospheric pressure, with a top temperature between 90° C. and 160° C., while the bottom temperature ranges from 110° C. to 190° C. The top gas phase of the octanol distillation column 44 is condensed in the second reboiler of the second butyraldehyde isomer column 33, with the resulting liquid flowing into the octanol distillation column reflux tank 46. The material in the octanol distillation column reflux tank 46 is conveyed by the octanol distillation column reflux pump 47, with a portion returning as reflux to the top of the octanol distillation column 44 and another portion extracted as octanol product. The material from the bottom of the octanol distillation column 44, as the heavy components, is pumped out by the octanol distillation column bottom pump 48.

Furthermore, the top temperature of the butanol distillation column is higher than the bottom temperature of the second butanol isomer column, and the top temperature of the second butanol isomer column is higher than the bottom temperature of the first butanol isomer column;

the top temperature of the octanol distillation column is higher than the bottom temperature of the second butyraldehyde isomer column, and the top temperature of the second butyraldehyde isomer column is higher than the bottom temperature of the first butyraldehyde isomer column; and the temperature difference between each pair is greater than or equal to 5° C., with the temperature differences ranging from 5° C. to 50° C. between each pair, preferably between 10° C. and 30° C.

The temperature difference is the driving force for heat transfer in heat exchangers, according to the fundamental heat transfer equation:

$$Q = KA\Delta tm$$

Where:
Q—Heat transfer rate, W
K—Proportionality coefficient, $W/m^2 \cdot °C$.
A—Heat transfer area, $m^2$
Δtm—Temperature difference, ° C.

The driving force for heat transfer comes from the temperature difference between the hot and cold streams. If the temperature difference is too small, it can lead to temperature cross effects affecting heat transfer, and the heat transfer area of the heat exchanger will be excessively large, which is economically unreasonable. To create temperature differences between different columns, pressure needs to be controlled. However, it is economically unreasonable to simply increase the pressure difference between two columns just to widen the temperature difference between them. Therefore, the temperature difference between the top and bottom of the columns involved in heat exchange needs to be limited to the range of 5° C. to 50° C.

In the present disclosure, the feedstock can be a mixture of butyraldehyde produced from propylene carbonylation reaction or a mixture primarily composed of n-butyraldehyde and iso-butyraldehyde. Preferably, the composition of the feedstock should meet the process requirements within the following ranges: the mixture of n-butyraldehyde and iso-butyraldehyde accounts for 90% to 100%, the light components account for 0% to 4%, and the heavy components account for 0% to 6%. The ratio of n-butanol to iso-butanol can range from 1:1 to 15:1.

In the present disclosure, the refluxed material from the top of both the first butyraldehyde isomer column and the second butyraldehyde isomer column is iso-butyraldehyde or mixture of butyraldehyde, which can be extracted for other purposes. Preferably, it can be directed into the butanol reaction system as feedstock to participate in reactions again.

Based on the different physical properties of gas and liquid phases in each column, column internals can be selected according to the following formula:

The flow parameter FP is calculated using the formula:

$$FP = \frac{L}{V}\sqrt{\frac{\rho_g}{\rho_l}}$$

Where:
L—Liquid load, kmol/s.
V—Gas load, kmol/s.
$\rho_g$—Gas density, kg/m³.
$\rho_l$—Liquid density, kg/m³.

When FP=0.02~0.3, packed columns are more efficient compared to plate columns. In the process of the present disclosure, the FP values for each column are between 0.02 and 0.2, making packed columns more suitable. Additionally, packed columns provide better separation efficiency and lower overall pressure drop for the same column height, making them more suitable for the heat exchange system in the present disclosure. Therefore, packed columns are chosen for all examples described below.

Embodiment 1

In the Butanol Separation Process:

The mixture of butyraldehyde, derived from the propylene carbonylation reaction (where the ratio of n-butyraldehyde to iso-butyraldehyde is approximately 10:1), is processed through the butanol reaction system 1. After overall hydrogenation, the mixture of butanol containing a small amount of impurities is obtained.

The mixture of butanol is sent to the butanol pre-distillation column 2, where a butanol pre-distillation column reboiler 3 is installed, utilizing steam as its heat source. The operating conditions for the butanol pre-distillation column 2 are as follows: the top pressure is 50 kPa (G), with a top temperature of 99° C. and a bottom temperature of 133° C. The top gas phase of the butanol pre-distillation column 2 is condensed in the butanol pre-distillation column condenser 4, which uses circulating water as a refrigerant. The resulting liquid flows into the butanol pre-distillation column reflux phase separation tank 5, where the aqueous phase is discharged from the interface. The organic phase in the butanol pre-distillation column reflux phase separation tank 5 is conveyed by the butanol pre-distillation column reflux pump 6, with a portion returning as reflux to the top of the butanol pre-distillation column 2, while another portion is taken out as light components.

The material from the bottom of the butanol pre-distillation column 2 is conveyed into the butanol distillation column 8 by the butanol pre-distillation column bottom pump 7. The butanol distillation column 8 is equipped with a butanol distillation column reboiler 9, which utilizes steam as its heat source. The operating conditions for the butanol distillation column 8 are as follows: the pressure at top is 50 kPa (G), with a top temperature of 137° C. and a bottom temperature of 168° C. The top gas phase of the butanol distillation column 8 is condensed in the second butanol isomer column reboiler 21, with the condensed liquid flowing into the butanol distillation column reflux phase separation tank 10. The aqueous phase in the butanol distillation column reflux phase separation tank 10 is discharged from the interface, while the organic phase is conveyed by the butanol distillation column reflux pump 11. A portion of the organic phase returns as reflux to the top of the butanol distillation column 8, while another portion is taken out as light components and then returned to the butanol pre-distillation column 2. The heavy components from the bottom of the butanol distillation column 8 are extracted using the butanol distillation column bottom pump 12. The material extracted from the side stream of the butanol distillation column 8 is split into two streams after being extracted by the butanol distillation column side stream pump 13. One stream enters the first butanol isomer column 14, while the other enters the second butanol isomer column 20.

The first butanol isomer column 14 is equipped with a first butanol isomer column reboiler 15, which utilizes the gas phase from the top of the second butanol isomer column as the heat source of the first butanol isomer column reboiler. The operating conditions for the first butanol isomer column 14 are as follows: the pressure at the top is −60 kPa (G), with a top temperature of 76° C., while the bottom temperature is 90° C. The gas phase from the top of the first butanol isomer column 14 is condensed in the first butanol isomer column condenser 16, using circulating water as the refrigerant. The condensed liquid then flows into the first butanol isomer column reflux tank 17. The material in the first butanol isomer column reflux tank 17 is conveyed by the first butanol isomer column reflux pump 18, with a portion returning as reflux to the top of the first butanol isomer column 14, while another portion is taken out as iso-butanol product. The n-butanol product from the bottom of the first butanol isomer column 14 is pumped out by the first butanol isomer column bottom pump 19 and collected in the n-butanol product tank.

The second butanol isomer column 20 is equipped with a second butanol isomer column reboiler 21, which utilizes the gas phase from the top of the butanol distillation column as its heat source. The operating conditions for the second butanol isomer column 20 are as follows: the pressure at the top is −15 kPa (G), with a top temperature of 110° C., while the bottom temperature is 125° C. The gas phase from the top of the second butanol isomer column 20 is condensed in the first butanol isomer column reboiler 15, and the resulting liquid flows into the second butanol isomer column reflux tank 22. The material in the second butanol isomer column reflux tank 22 is conveyed by the second butanol isomer column reflux pump 23, with a portion returning as reflux to the top of the second butanol isomer column 20, while another portion is taken out as iso-butanol product. The n-butanol product from the bottom of the second butanol isomer column 20 is pumped out by the second butanol isomer column bottom pump 24 and collected in the n-butanol product tank.

In the Octanol Separation Process:

The mixture of butyraldehyde from the propylene carbonylation reaction (with a ratio of approximately 10:1 of n-butyraldehyde to iso-butyraldehyde) is split into two streams, one entering the first butyraldehyde isomer column 25, and the other entering the second butyraldehyde isomer column 31.

The first butyraldehyde isomer column 25 is equipped with a first butyraldehyde isomer column reboiler 26, which utilizes the gas phase from the top of the second butyraldehyde isomer column as the heat source. The operating conditions for the top of the first butyraldehyde isomer column 25 are as follows: the pressure at the top is −50 kPa (G), with a top temperature of 55° C., while the bottom temperature is 70° C. The gas phase from the top of the first butyraldehyde isomer column 25 is condensed in the first butyraldehyde isomer column condenser 27, using circulating water as the refrigerant. The condensed liquid then flows into the first butyraldehyde isomer column reflux phase separation tank 28. The material in the first butyraldehyde isomer column reflux phase separation tank 28 is conveyed by the first butyraldehyde isomer column reflux pump 29. A portion returns as reflux to the top of the first butyraldehyde isomer column 25, while another portion is taken out as iso-butanol or mixture of butanol product. The material from the bottom of the first butyraldehyde isomer column 25 is conveyed by the first butyraldehyde isomer column bottom pump 30, and n-butyraldehyde is taken out.

The second butyraldehyde isomer column 31 is equipped with two reboilers: one is the first reboiler of the second butyraldehyde isomer column 32, which uses steam as its heat source; the other is the second reboiler of the second butyraldehyde isomer column 33, which utilizes the gas phase from the top of the octanol distillation column as its heat source. The operating conditions for the second butyraldehyde isomer column 31 are as follows: the pressure at the top is 100 kPa (G), with a top temperature of 80° C., while the bottom temperature is 98° C. The gas phase from the top of the second butyraldehyde isomer column 31 is condensed in the first butyraldehyde isomer column reboiler 26. The condensed liquid then flows into the second butyraldehyde isomer column reflux phase separation tank 34. The aqueous phase in the second butyraldehyde isomer column reflux phase separation tank 34 is discharged from the interface, while the organic phase in the second butyraldehyde isomer column reflux phase separation tank 34 is conveyed by the second butyraldehyde isomer column reflux pump 35. A portion returns as reflux to the top of the second butyraldehyde isomer column 31, while the remainder is taken out in the iso-butyraldehyde or mixture of butyraldehyde storage tank. The material from the bottom of the second butyraldehyde isomer column 31 is conveyed by the second butyraldehyde isomer column bottom pump 36, and n-butyraldehyde is taken out.

The n-butyraldehyde is processed through the octanol reaction system 37, and after overall condensation and hydrogenation, crude octanol with a small amount of impurities is obtained.

The material from the octanol reaction system is sent to the octanol pre-distillation column 38. The octanol pre-distillation column 38 is equipped with an octanol pre-distillation column reboiler 39, which uses steam as its heat source. The top pressure of the octanol pre-distillation column 38 is −50 kPa (G), with a top temperature of 80° C. and a bottom temperature of 146° C. The top gas phase of the octanol pre-distillation column 38 enters the octanol pre-distillation column condenser 40 for condensation. The condensed liquid then flows into the octanol pre-distillation column reflux phase separation tank 41. The aqueous phase in the octanol pre-distillation column reflux phase separation tank 41 is discharged from the interface, while the organic phase in the octanol pre-distillation column reflux phase separation tank 41 is conveyed by the octanol pre-distillation column reflux pump 42. A portion returns as reflux to the top of the octanol pre-distillation column 38, while another portion is taken out as light components.

The material from the bottom of the octanol pre-distillation column 38 is transported to the octanol distillation column 44 by the octanol pre-distillation column bottom pump 43. The octanol distillation column 44 is equipped with an octanol distillation column reboiler 45, which utilizes steam as its heat source. The top pressure of the octanol distillation column 44 is −50 kPa (G), with a top temperature of 146° C. and a bottom temperature of 170° C. The top gas phase of the octanol distillation column 44 enters the second reboiler of the second butyraldehyde isomer column 33 for condensation. The condensed liquid then flows into the octanol distillation column reflux tank 46. The material in the octanol distillation column reflux tank 46 is conveyed by the octanol distillation column reflux pump 47. A portion returns as reflux to the top of the octanol distillation column 44, while another portion is taken out as octanol product. The material from the bottom of the octanol distillation column 44, as heavy components, is taken out via the octanol distillation column bottom pump 48.

Embodiment 2

In the Butanol Separation Process:

The mixture of butyraldehyde (with a ratio of n-butyraldehyde to iso-butyraldehyde approximately 5:1) is processed through a butanol reaction system 1, and after overall hydrogenation, yields mixture of butanol containing a small amount of impurities.

The mixture of butanol is sent to the butanol pre-distillation column 2. The butanol pre-distillation column 2 is equipped with a butanol pre-distillation column reboiler 3, which uses steam as its heat source. The top pressure of the butanol pre-distillation column 2 is 20 kPa (G), with a top temperature of 82° C. and a bottom temperature of 113° C. The top gas phase of the butanol pre-distillation column 2 enters the butanol pre-distillation column condenser 4 for condensation, using circulating water as the refrigerant. The condensed liquid then flows into the butanol pre-distillation column reflux phase separation tank 5. The aqueous phase in the butanol pre-distillation column reflux phase separation tank 5 is discharged from the interface, while the organic phase in the butanol pre-distillation column reflux phase separation tank 5 is conveyed by the butanol pre-distillation column reflux pump 6. A portion returns as reflux to the top of the butanol pre-distillation column 2, while another portion is taken out as light components.

The material from the bottom of the butanol pre-distillation column 2 is conveyed into the butanol distillation column 8 by the butanol pre-distillation column bottom pump 7. The butanol distillation column 8 is equipped with a butanol distillation column reboiler 9, which uses steam as its heat source. The top pressure of the butanol distillation column 8 is 20 kPa (G), with a top temperature of 114° C. and a bottom temperature of 133° C. The top gas phase of the butanol distillation column 8 enters the second butanol isomer column reboiler 21 for condensation. The condensed liquid then flows into the butanol distillation column reflux phase separation tank 10. The aqueous phase in the butanol distillation column reflux phase separation tank 10 is discharged from the interface, while the organic phase in the butanol distillation column reflux phase separation tank 10 is conveyed by the butanol distillation column reflux pump 11. A portion returns as reflux to the top of the butanol distillation column 8, while another portion, after being extracted as light components, returns to the butanol pre-distillation column 2. The heavy components from the bottom of the butanol distillation column 8 are extracted via the butanol distillation column bottom pump 12. The material extracted from the side stream of the butanol distillation column 8 is split into two streams after being extracted by the butanol distillation column side stream pump 13. One stream enters the first butanol isomer column 14, while the other enters the second butanol isomer column 20.

The first butanol isomer column 14 is equipped with a first butanol isomer column reboiler 15, which utilizes the gas phase from the top of the second butanol isomer column as the heat source. The operating conditions for the top of the first butanol isomer column 14 are as follows: the pressure at the top is −78 kPa (G), with a top temperature of 45° C., while the bottom temperature is 71° C. The gas phase from the top of the first butanol isomer column 14 is condensed in the first butanol isomer column condenser 16, using circulating water as the refrigerant. The condensed liquid then flows into the first butanol isomer column reflux tank 17. The material in the first butanol isomer column reflux tank 17 is conveyed by the first butanol isomer column reflux pump 18. A portion returns as reflux to the top of the first butanol isomer column 14, while another portion is taken out as iso-butanol product. The n-butanol product from the bottom of the first butanol isomer column 14 is taken out and transported to the n-butanol product tank by the first butanol isomer column bottom pump 19.

The second butanol isomer column 20 is equipped with a second butanol isomer column reboiler 21, which utilizes the gas phase from the top of the butanol distillation column as the heat source. The operating conditions for the top of the second butanol isomer column 20 are as follows: the pressure at the top is −45 kPa (G), with a top temperature of 88° C., while the bottom temperature is 102° C. The gas phase from the top of the second butanol isomer column 20 is condensed in the first butanol isomer column reboiler 15. The condensed liquid then flows into the second butanol isomer column reflux tank 22. The material in the second butanol isomer column reflux tank 22 is conveyed by the second butanol isomer column reflux pump 23. A portion returns as reflux to the top of the second butanol isomer column 20, while another portion is taken out as iso-butanol product. The n-butanol product from the bottom of the second butanol isomer column 20 is taken out and transported to the n-butanol product tank by the second butanol isomer column bottom pump 24.

In the Octanol Separation Process:

The mixture of butyraldehyde (with a ratio of n-butyraldehyde to iso-butyraldehyde approximately 5:1) is split into two streams, with one stream entering the first butyraldehyde isomer column 25 and the other entering the second butyraldehyde isomer column 31.

The first butyraldehyde isomer column 25 is equipped with a first butyraldehyde isomer column reboiler 26, which utilizes the gas phase from the top of the second butyraldehyde isomer column as the heat source. The operating conditions for the top of the first butyraldehyde isomer column 25 are as follows: the pressure at the top is −98 kPa (G), with a top temperature of 21° C., while the bottom temperature is 42° C. The gas phase from the top of the first butyraldehyde isomer column 25 is condensed in the first butyraldehyde isomer column condenser 27, using circulating water as the refrigerant. The condensed liquid then flows into the first butyraldehyde isomer column reflux phase separation tank 28. The material in the first butyraldehyde isomer column reflux phase separation tank 28 is conveyed by the first butyraldehyde isomer column reflux pump 29. A portion returns as reflux to the top of the first butyraldehyde isomer column 25, while another portion is taken out as iso-butanol or mixture of butanol product. The material from the bottom of the first butyraldehyde isomer column 25 is conveyed by the first butyraldehyde isomer column bottom pump 30, and n-butyraldehyde is taken out.

The second butyraldehyde isomer column 31 is equipped with two reboilers: one is the first reboiler of the second butyraldehyde isomer column 32, which uses steam as its heat source; the other is the second reboiler of the second butyraldehyde isomer column 33, which utilizes the gas phase from the octanol distillation column as its heat source.

The top pressure of the second butyraldehyde isomer column 31 is 50 kPa (G), with a top temperature of 61° C. and a bottom temperature of 81° C. The top gas phase of the second butyraldehyde isomer column 31 enters the first butyraldehyde isomer column reboiler 26 for condensation. The condensed liquid then flows into the second butyraldehyde isomer column reflux phase separation tank 34. The aqueous phase in the second butyraldehyde isomer column reflux phase separation tank 34 is discharged from the interface, while the organic phase in the second butyraldehyde isomer column reflux phase separation tank 34 is conveyed by the second butyraldehyde isomer column reflux pump 35. A portion returns as reflux to the top of the second butyraldehyde isomer column 31, while another part is taken out as the iso-butyraldehyde or mixture of butyraldehyde tank. The material from the bottom of the second butyraldehyde isomer column 31 is transported via the second butyraldehyde isomer column bottom pump 36 and extracted as n-butyraldehyde.

The n-butyraldehyde is processed through an octanol reaction system 37, and after overall condensation and hydrogenation, yields crude octanol containing a small amount of impurities.

The material from the octanol reaction system is sent to the octanol pre-distillation column 38. The octanol pre-distillation column 38 is equipped with an octanol pre-distillation column reboiler 39, which uses steam as its heat source. The top pressure of octanol pre-distillation column 38 is −88 kPa (G), with a top temperature of 75° C. and a bottom temperature of 138° C. The top gas phase of the octanol pre-distillation column 38 enters the octanol pre-distillation column condenser 40 for condensation. The condensed liquid then flows into the octanol pre-distillation column reflux phase separation tank 41. The aqueous phase in the octanol pre-distillation column reflux phase separation tank 41 is discharged from the interface, while the organic phase in the octanol pre-distillation column reflux phase separation tank 41 is conveyed by octanol pre-distillation column reflux pump 42. A portion returns as reflux to the top of octanol pre-distillation column 38, while another portion is taken out as light components.

The material from the bottom of the octanol pre-distillation column 38 is transported to the octanol distillation column 44 by the octanol pre-distillation column bottom pump 43. The octanol distillation column 44 is equipped with an octanol distillation column reboiler 45, which utilizes steam as its heat source. The top pressure of the octanol distillation column 44 is −90 kPa (G), with a top temperature of 97° C. and a bottom temperature of 153° C. The top gas phase of the octanol distillation column 44 enters the second reboiler of the second butyraldehyde isomer column 33 for condensation. The condensed liquid then flows into the octanol distillation column reflux tank 46. The material in the octanol distillation column reflux tank 46 is conveyed by the octanol distillation column reflux pump 47. A portion returns as reflux to the top of the octanol distillation column 44, while another portion is taken out as octanol product. The material from the bottom of the octanol distillation column 44, as heavy components, is taken out via the octanol distillation column bottom pump 48.

Embodiment 3

In the Butanol Separation Process:

The mixture of butyraldehyde (with a ratio of n-butyraldehyde to iso-butyraldehyde approximately 13:1) undergoes the butanol reaction system 1, and after overall hydrogenation, yields mixture of butanol containing a small amount of impurities.

The mixture of butanol is sent to the butanol pre-distillation column 2, which is equipped with a butanol pre-distillation column reboiler 3 using steam as its heat source. The operating conditions for the butanol pre-distillation column 2 are as follows: the pressure at the top is 96 kPa (G), with a top temperature of 135° C. and a bottom temperature of 166° C. The gas phase from the top of the butanol pre-distillation column 2 is condensed in the butanol pre-distillation column condenser 4, using circulating water as the refrigerant. The condensed liquid then flows into the butanol pre-distillation column reflux phase separation tank 5. The aqueous phase in the butanol pre-distillation column reflux phase separation tank 5 is discharged from the interface, while the organic phase in the butanol pre-distillation column reflux phase separation tank 5 is conveyed by the butanol pre-distillation column reflux pump 6. A portion returns as reflux to the top of the butanol pre-distillation column 2, while another portion is taken out as light components.

The material from the bottom of the butanol pre-distillation column 2 is transported to the butanol distillation column 8 by the butanol pre-distillation column bottom pump 7. The butanol distillation column 8 is equipped with a butanol distillation column reboiler 9, which uses steam as its heat source. The operating conditions for the butanol distillation column 8 are as follows: the pressure at the top is 92 kPa (G), with a top temperature of 162° C. and a bottom temperature of 183° C. The top gas phase of the butanol distillation column 8 enters the second butanol isomer column reboiler 21 for condensation. The condensed liquid then flows into the butanol distillation column reflux phase separation tank 10. The aqueous phase in the butanol distillation column reflux phase separation tank 10 is discharged from the interface, while the organic phase in the butanol distillation column reflux phase separation tank 10 is conveyed by the butanol distillation column reflux pump 11. A portion returns as reflux to the top of the butanol distillation column 8, while another portion is taken out as light components and returned to the butanol pre-distillation column 2. The heavy components from the bottom of the butanol distillation column 8 are extracted via the butanol distillation column bottom pump 12. The material extracted from the side stream of the butanol distillation column 8 is divided into two streams after being extracted by the butanol distillation column side stream pump 13, with one stream entering the first butanol isomer column 14 and the other entering the second butanol isomer column 20.

The first butanol isomer column 14 is equipped with a first butanol isomer column reboiler 15, which utilizes the gas phase from the top of the second butanol isomer column as the heat source. The operating conditions for the first butanol isomer column 14 are as follows: the pressure at the top is −20 kPa (G), with a top temperature of 85° C. and a bottom temperature of 109° C. The top gas phase of the first butanol isomer column 14 is condensed in the first butanol isomer column condenser 16, using circulating water as the refrigerant. The condensed liquid then flows into the first butanol isomer column reflux tank 17. The material in the first butanol isomer column reflux tank 17 is conveyed by the first butanol isomer column reflux pump 18. A portion returns as reflux to the top of the first butanol isomer column 14, while another portion is taken out as iso-butanol product. The n-butanol product from the bottom of the first butanol isomer column 14 is conveyed by the first butanol isomer column bottom pump 19 and extracted to the n-butanol product tank.

The second butanol isomer column 20 is equipped with a second butanol isomer column reboiler 21, which utilizes the gas phase from the top of the butanol distillation column as the heat source. The operating conditions for the second butanol isomer column 20 are as follows: the pressure at the top is 30 kPa (G), with a top temperature of 128° C. and a bottom temperature of 145° C. The gas phase from the top of the second butanol isomer column 20 is condensed in the first butanol isomer column reboiler 15. The condensed liquid then flows into the second butanol isomer column reflux tank 22. The material in the second butanol isomer column reflux tank 22 is conveyed by the second butanol isomer column reflux pump 23. A portion returns as reflux to the top of the second butanol isomer column 20, while another portion is taken out as iso-butanol product. The n-butanol product from the bottom of the second butanol isomer column 20 is conveyed by the second butanol isomer column bottom pump 24 and extracted into the n-butanol product tank.

In the Octanol Separation Process:

The mixture of butyraldehyde (with a ratio of n-butyraldehyde to iso-butyraldehyde approximately 13:1) is divided into two streams, with one stream entering first butyraldehyde isomer column 25 and the other entering second butyraldehyde isomer column 31.

The first butyraldehyde isomer column 25 is equipped with a first butyraldehyde isomer column reboiler 26, which utilizes the gas phase from the top of the second butyraldehyde isomer column as the heat source. The operating conditions for the first butyraldehyde isomer column 25 are as follows: the pressure at the top is −15 kPa (G), with a top temperature of 67° C. and a bottom temperature of 81° C. The gas phase from the top of the first butyraldehyde isomer column 25 enters the first butyraldehyde isomer column condenser 27 for condensation, using circulating water as the refrigerant. The condensed liquid then flows into the first butyraldehyde isomer column reflux phase separation tank 28. The material in the first butyraldehyde isomer column reflux phase separation tank 28 is conveyed by the first butyraldehyde isomer column reflux pump 29. A portion returns as reflux to the top of the first butyraldehyde isomer column 25, while another portion is taken out as iso-butanol or mixture of butanol product. The material from the bottom of the first butyraldehyde isomer column 25 is conveyed by the first butyraldehyde isomer column bottom pump 30 and extracted as n-butyraldehyde.

The second butyraldehyde isomer column 31 is equipped with two reboilers: one is the first reboiler of the second butyraldehyde isomer column 32, which uses steam as its heat source; the other is the second reboiler of the second butyraldehyde isomer column 33, which utilizes the gas phase from the top of the octanol distillation column as its heat source. The operating conditions for the second butyraldehyde isomer column 31 are as follows: the pressure at the top is 180 kPa (G), with a top temperature of 110° C., while the bottom temperature is 129° C. The gas phase from the top of the second butyraldehyde isomer column 31 is condensed in the first butyraldehyde isomer column reboiler 26. The condensed liquid then flows into the second butyraldehyde isomer column reflux phase separation tank 34. The aqueous phase in the second butyraldehyde isomer column reflux phase separation tank 34 is discharged from the interface, while the organic phase in the second butyraldehyde isomer column reflux phase separation tank 34 is conveyed by the second butyraldehyde isomer column reflux pump 35. A portion returns as reflux to the top of the second butyraldehyde isomer column 31, while another portion is taken out as the iso-butyraldehyde or mixture of butyraldehyde storage tank. The material from the bottom of the second butyraldehyde isomer column 31 is conveyed by the second butyraldehyde isomer column bottom pump 36, and n-butyraldehyde is taken out.

The n-butyraldehyde is processed through the octanol reaction system 37 and after overall condensation and hydrogenation, crude octanol with a small amount of impurities is obtained.

Materials from the octanol reaction system are sent to the octanol pre-distillation column 38. The octanol pre-distillation column 38 is equipped with an octanol pre-distillation column reboiler 39, which utilizes steam as its heat source. The top pressure of the octanol pre-distillation column 38 is −10 kPa (G), with a top temperature of 123° C. and a bottom temperature of 171° C. The top gas phase of the octanol pre-distillation column 38 enters the octanol pre-distillation column condenser 40 for condensation. The condensed liquid then flows into the octanol pre-distillation column reflux phase separation tank 41. The aqueous phase in the octanol pre-distillation column reflux phase separation tank 41 is discharged from the interface, while the organic phase in octanol pre-distillation column reflux phase separation tank 41 is conveyed by the octanol pre-distillation column reflux pump 42. A portion returns as reflux to the top of the octanol pre-distillation column 38, while another portion is taken out as light components.

The material from the bottom of the octanol pre-distillation column 38 is transported to the octanol distillation column 44 by the octanol pre-distillation column bottom pump 43. The octanol distillation column 44 is equipped with an octanol distillation column reboiler 45, which utilizes steam as its heat source. The operating conditions for the octanol distillation column 44 are as follows: the pressure at the top is −8 kPa (G), with a top temperature of 143° C. and a bottom temperature of 182° C. The top gas phase of the octanol distillation column 44 is condensed in the second reboiler of the second butyraldehyde isomer column 33, with the resulting liquid flowing into the octanol distillation column reflux tank 46. The material in the octanol distillation column reflux tank 46 is conveyed by the octanol distillation column reflux pump 47, with a portion returning as reflux to the top of the octanol distillation column 44 and another portion extracted as octanol product. The material from the bottom of the octanol distillation column 44, as the heavy components, is pumped out by the octanol distillation column bottom pump 48.

Under the same feed conditions, the energy consumption ratio is as follows:

|  | Energy consumption (kW) | Reduction ratio in energy consumption |
|---|---|---|
| Davy process | 28874 |  |
| Embodiment 1 | 13112 | 0.45 |
| Embodiment 2 | 15126 | 0.52 |
| Embodiment 3 | 12497 | 0.43 |

In the present disclosure, the top gas phase of the butanol distillation column serves as the heat source for the reboiler of the second butanol isomer column; the top gas phase of the second butanol isomer column serves as the heat source for the reboiler of the first butanol isomer column; the top gas phase of the second butyraldehyde isomer column serves as the heat source for the reboiler of the first butyraldehyde isomer column; and the top gas phase of the octanol distillation column serves as the heat source for the reboiler of the second butyraldehyde isomer column. This achieves a triple-effect heat exchange thermal coupling between the butanol separation process and the octanol separation process, significantly reducing the usage of steam and cooling water, thus lowering production energy consumption.

The triple-effect distillation method for production of butanol and octanol in the present disclosure involves separate heat exchange arrangements for the butanol separation process and the octanol separation process. Both processes can operate independently for the separation of butanol and octanol respectively, or they can be combined for joint operation. When used together, both processes utilize the same feedstocks. The proportions of these materials for each process can be adjusted according to market demands, thus facilitating the production of the desired quantities of butanol and octanol.

The aspects not described in the present disclosure are applicable to the prior art.

What is claimed is:

1. An equipment for production of butanol and octanol, wherein the equipment comprises eight columns: a butanol pre-distillation column, a butanol distillation column, a first butanol isomer column, a second butanol isomer column, a first butyraldehyde isomer column, a second butyraldehyde isomer column, an octanol pre- distillation column and an octanol distillation column; wherein each column is equipped with a corresponding condenser, reflux phase separation tank and reboiler;

a feed inlet of the butanol pre-distillation column is fluidly connected to an outlet of a butanol reactor;

a bottom outlet of the butanol pre-distillation column is fluidly connected to a feed inlet of the butanol distillation column, and a top outlet of the butanol pre-distillation column is configured to discharge product stream comprising a first light component stream;

a bottom outlet of the butanol distillation column discharges a first heavy component stream, and a top gas phase outlet of the butanol distillation column is fluidly connected to a heat exchange inlet of the reboiler of the second butanol isomer column, a heat exchange outlet of the reboiler of the second butanol isomer column is fluidly connected to the reflux phase separation tank of the butanol distillation column for reflux at a top of the butanol distillation column, and the reflux phase separation tank of the butanol distillation column is fluidly connected to the feed inlet of the butanol pre-distillation column via a pipeline;

a side outlet of the butanol distillation column is fluidly connected to the first butanol isomer column and the second butanol isomer column, respectively;

the reboiler of the first butanol isomer column is the condenser of the second butanol isomer column, and both a bottom of the first butanol isomer column and a bottom of the second butanol isomer column discharge n-butanol;

wherein a portion of a reflux material condensed at a top of the first butanol isomer column is fluidly directed to a top inlet of the first butanol isomer column via a pipeline, and another portion is discharged as iso-butanol product;

wherein a portion of a reflux material condensed at a top of the second butanol isomer column is fluidly directed to a top inlet of the second butanol isomer column via a pipeline, and another portion is discharged as iso-butanol product;

a feed for both the first butyraldehyde isomer column and the second butyraldehyde isomer column is a mixture of butyraldehyde derived from a propylene carbonylation reaction, and reflux outlets in the reflux phase separation tank of the first butyraldehyde isomer column and the reflux phase separation tank of the second butyraldehyde isomer column are configured to discharge iso-butyraldehyde or the mixture of butyraldehyde, and said reflux outlets are fluidly connected to a feed inlet of the butanol;

the reboiler of the first butyraldehyde isomer column is the condenser of the second butyraldehyde isomer column, and bottom outlets of the first butyraldehyde isomer column and the second butyraldehyde isomer column are fluidly connected to an inlet of an octanol reactor, and an outlet of the octanol reactor is fluidly connected to a feed inlet of the octanol pre-distillation column;

the reboiler of the second butyraldehyde isomer column is the condenser of the octanol distillation column;

wherein a portion of a reflux material condensed at a top of the octanol pre-distillation column is fluidly directed to a top inlet of the octanol pre-distillation column via a pipeline, and another portion is discharged as a second light component stream; and a bottom outlet of the octanol pre-distillation column is fluidly connected to a feed inlet of the octanol distillation column, a bottom of the octanol distillation column discharges a second heavy component stream, and after condensation reflux at a top of the octanol distillation column, octanol is discharged.

2. The equipment for production of butanol and octanol according to claim 1, wherein the reboiler of the second butyraldehyde isomer column includes two parallel reboilers, one of the two parallel reboilers is a first reboiler of the second butyraldehyde isomer column, which uses steam as a heat source; another one of the two parallel reboilers is a second reboiler of the second butyraldehyde isomer column, which uses a top gas phase from the octanol distillation column as a heat source; and a feed for the butanol reactor is a mixture of butyraldehyde from propylene hydroformylation reaction.

* * * * *